United States Patent [19]

Shimpo et al.

[11] Patent Number: 4,823,023
[45] Date of Patent: Apr. 18, 1989

[54] TRANSISTOR WITH DIFFERENTIATED CONTROL SWITCHING CIRCUIT

[75] Inventors: Tetsuhiko Shimpo; Isao Fujihata; Atsushi Yanase, all of Tokyo, Japan

[73] Assignee: Nippon Chemi-Con Corporation, Tokyo, Japan

[21] Appl. No.: 884,651

[22] Filed: Jul. 15, 1986

Related U.S. Application Data

[63] Continuation of Ser. No. 500,197, Jun. 1, 1983, abandoned.

[30] Foreign Application Priority Data

Jun. 1, 1982 [JP] Japan .................................. 57-93488
Sep. 10, 1982 [JP] Japan ............................... 57-157704
Sep. 10, 1982 [JP] Japan .......................... 57-137560[U]

[51] Int. Cl.⁴ ........................ H03K 17/60; H03K 3/06
[52] U.S. Cl. ................................... 307/254; 307/255; 307/270; 307/296.6
[58] Field of Search ............... 307/297, 254, 270, 255; 323/285, 271, 283, 284

[56] References Cited

U.S. PATENT DOCUMENTS

| | | | |
|---|---|---|---|
| 3,323,034 | 5/1967 | Dublin et al. | 323/285 |
| 3,470,391 | 9/1969 | Granger | 307/268 |
| 3,629,622 | 12/1971 | Deneberg Jr. | 307/297 |
| 3,657,572 | 4/1972 | Millman | 307/297 |
| 3,686,516 | 8/1972 | Guadagnolo | 307/268 |
| 3,787,738 | 1/1974 | Horwath | 307/268 |
| 4,017,789 | 4/1977 | Morris | 323/285 |
| 4,464,585 | 8/1984 | Seki | 307/263 |

Primary Examiner—Stanley D. Miller
Assistant Examiner—Nancy Thai
Attorney, Agent, or Firm—Sughrue, Mion, Zinn, Macpeak, and Seas

[57] ABSTRACT

A switching circuit is improved in efficiency by including a switching corrector circuit for feeding back reversed polarity, differentiated switching pulses to the base of the switching transistor. In addition, temperature stability is achieved by providing a constant current source for a drive transistor which drives the switching transistor and for a control transistor which controls the drive transistor on the basis of the detected output of the circuit.

11 Claims, 9 Drawing Sheets

TRANSISTOR WITH DIFFERENTIATED CONTROL SWITCHING CIRCUIT

This is a continuation of application Ser. No. 500,197 filed June 1, 1983 now abandoned.

BACKGROUND OF THE INVENTION

The present invention relates to a switching circuit, and more particularly, to a switching regulator having improved transducing efficiency.

Most electronic devices such as video tape recorders (VTR) and video cameras, whether they are portable or installed on vehicles on the like, use batteries as driving power. But the terminal voltage of batteries may vary greatly when a sudden change occurs in the load as a result of mode switching. To suppress these variations and stabilize the operation of the electronic devices, switching regulators are currently used.

Figure 1:
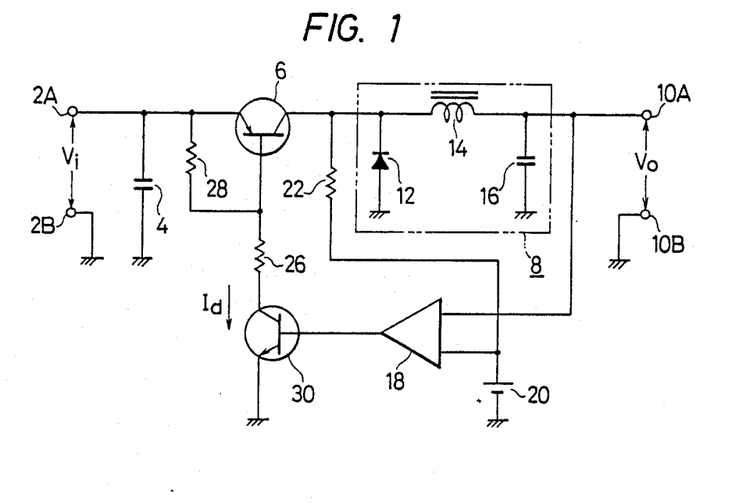
FIG. 1 is a circuit diagram showing a conventional switching regulator.

FIG. 1 shows a conventional step-down switching regulator. A d.c. input Vi supplied across input terminals 2A and 2B has any ripple component removed in a capacitor 4 provided between the two input terminals. The input then is converted into an a.c. voltage by a switching transistor 6. The a.c. voltage is rectified in a d.c. reproducing circuit 8 composed of a diode 12, a choke coil 14 and a capacitor 16. Subsequently, the d.c. voltage is drawn from output terminals 10A and 10B as a stabilized d.c. voltage Vo.

The d.c. output Vo developed across the terminals 10A and 10B is supplied to the inverting input terminal of a comparator 18, and to detect any variation in the output, it is compared with a reference voltage provided at the noninverting input terminal from a power supply 20. The noninverting input of the comparator 18 is also provided with an a.c. signal positively fed back from the collector of the switching transistor 6 through a resistor 22. Therefore, in the switching regulator of FIG. 1, the comparator 18 operates both as an error amplifier and oscillator, and functions as a pulse width modulating circuit that generates pulses having an ON-OFF duty ratio adaptive to variations in the level of the output Vo. The output pulse from the comparator 18 is applied as a control pulse to the base of a transistor 30 that supplied a drive current for the switching transistor 6.

In the switching regulator of FIG. 1, the switching operation of the transistor 6 exhibits both rise and fall times as well as a certain delay time with respect to a pulsive input. These delay features in the pulsing operation cause a delay in the response time and also a power loss resulting from the current flowing in the delay period (the power loss is that current integrated by time). This power loss reduces the efficiency of d.c. to a.c. conversion accomplished by the switching regulator, and to avoid this problem, the delay in the switching time must be eliminated.

This demand for increasing the transducing efficiency of switching regulators has another justification. Recent electronic devices are designed to operate at a low voltage, and if the transducing efficiency of the switching regulator is low, the service life of the battery is shortened.

Furthermore, improving the input-output characteristics of switching regulators is essential in stablizing the electronic devices with which the regulators are used.

SUMMARY OF THE INVENTION

Therefore, the primary purpose of the present invention is to provide a switching circuit that achieves efficient operation by reducing the switching time using a switching corrector circuit that picks up a pulse from the switching transistor after reversing its polarity, differentiates the reversed pulse and provides the base of the switching transistor with the differentiated pulse superposed on the input pulse.

A further object of the present invention is to provide a switching regulator having improved input-output characteristics, which includes constant-current supply means for supplying a constant current to a transistor for driving a switching transistor, as well as to a transistor for controlling the drive transistor.

DETAILED DESCRIPTION OF THE PREFERRED EMBODIMENTS

Preferred embodiments of the present invention will be hereunder described in detail, with reference to the accompanying figures, which show switching regulators according to the invention.

Figure 2:
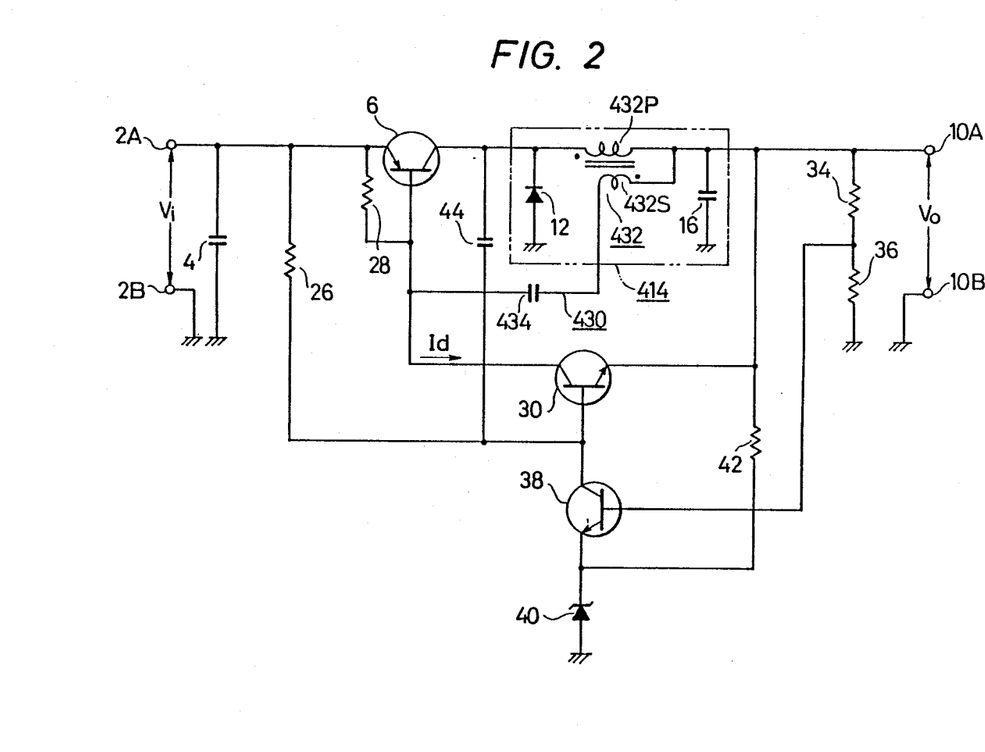
FIG. 2 is circuit diagram showing one embodiment of the switching circuit of the present invention.

In FIG. 2, circuit components which are the same as those shown in FIG. 1 are identified by like numerals. The regulator of FIG. 2 adds a switching corrector circuit 430 that reverses the polarity of switching pulses formed by the transistor 6, and which uses the differentials of the reversed pulses as part of the control pulse. In the embodiment shown, a transformer 432 included in the d.c. reproducing circuit 414 as a choke coil reverses the polarity of switching pulses from the transistor 6, and after being differentiated in a capacitor 434, those pulses are applied to the base of the transistor 6. To achieve this object, the transformer 432 has a primary winding 432P and a secondary winding 432S wound around a common iron core in a manner such that opposite polarities are produced, and in the embodiment shown, a choke transformer wherein the respective windings are connected at a common terminal is formed so that the polarity of the electromotive force induced in the secondary winding 432S is opposite the polarity of the input side. The primary winding 432P serves as a choke coil in the d.c. reproducing circuit 414 as in the conventional switching regulator, and the output terminal of the secondary winding 432S is connected to the base of the switching transistor 6 through the capacitor 434.

A drive transistor 30 is connected between the base of the switching transistor 6 and the output terminal of the d.c. reproducing circuit 414. More specifically, the transistor 30 is connected between the base and collector of the switching transistor 6 in a manner such that the collector is connected to the base of the transistor 6 and the emitter to the output of the circuit 414. The base of the transistor 30 is provided with a d.c. bias input through a resistor 26, as well as a switching output positively fed back from the collector of the transistor 6 through a capacitor 44.

The base of the transistor 30 is also connected to the collector of a transistor 38 for controlling the operating current flowing through the transistor 30. The emitter of the transistor 38 is connected to a constant-voltage diode 40 for providing a reference voltage. The anode of the diode 40 is connected to ground potential (GND). The emitter of the transistor 38 is also provided with the reproduced d.c. output from the circuit 414 through a resistor 42. The base of the transistor 38 is provided with a d.c. output from the junction between resistors 34 and 36 connected in series between two output terminals 10A and 10B. This d.c. output is compared with a reference voltage which is the sum of the forward voltage on the diode 40 and the voltage across the base and emitter of the transistor 38.

The switching regulator having the circuit configuration described above is operated as follows. If the d.c. output voltage detected at the junction between the resistors 34 and 36 is lower than the reference voltage, the transistor 38 operates in response to the resulting potential whereupon the transistor 30 is turned on and a drive current flows through the transistor 6 to the transistor 30. If the d.c. output voltage detected at the junction between the resistors 34 and 36 is higher than the reference voltage, the transistor 38 operates in response to the resulting potential and the transistor 30 is turned off. This switching operation is repeated consistently at a given oscillating frequency. As a result, the d.c. input Vi is converted to an a.c. voltage by the switching operation of the transistor 6, and the latter is rectified by the d.c. reproducing circuit 414 and, is drawn from the output terminals 10A and 10B as a stabilized output Vo. If a variation occurs in the d.c. input on account of load fluctuation or other factors, the switching regulator of the present invention achieves the intended stabilizing operation momentarily and thus keeps supplying a constant d.c. output to the load.

Figure 3:
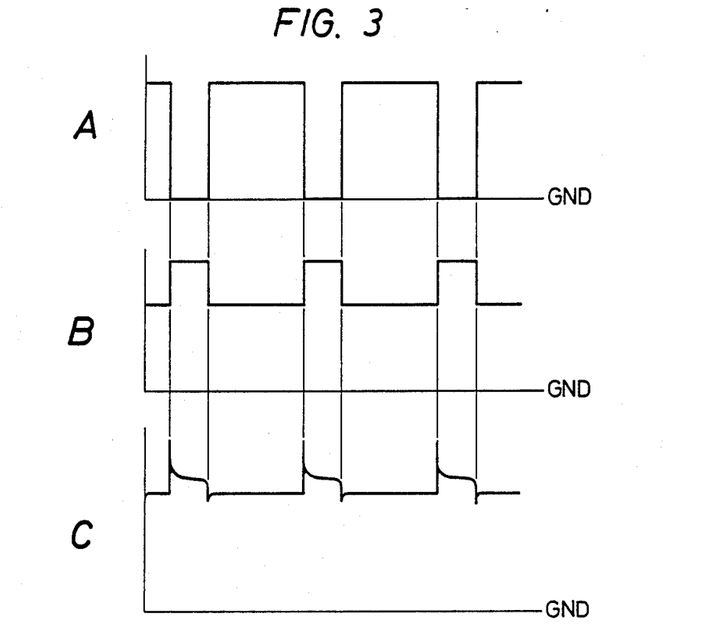
FIG. 3 shows the waveform of switching pulses produced in the switching circuit of the present invention.

FIG. 3A shows the waveform of pulses developed at the collector of the switching transistor 6 as a result of its switching operation. Since these pulses are applied to the primary winding 432P of the transformer 432, the secondary winding 432S produces pulses having their polarity reversed as shown in FIG. 3B. These pulses are superposed on a given level of d.c. voltage. They are then applied to the base of the switching transistor 6 through the capacitor 434, so the base of that transistor is provided with differential pulses as shown in FIG. 3C, together with the control input pulses coming from the transistor 30. The respective edges of the differential pulses are in good agrument with those of the initial switching pulses, and the leading and trailing edges of each pulse change their potential levels in opposite direction. Therefore, the differential pulses are timed to the switching operation of the transistor 6 and can accelerate the turning-on and off of that transistor. As a result, the switching time of the transistor 6 is shortened and the power loss occurring in the switching period can be reduced so as to increase the transducing efficiency of the switching regulator.

Figure 4:
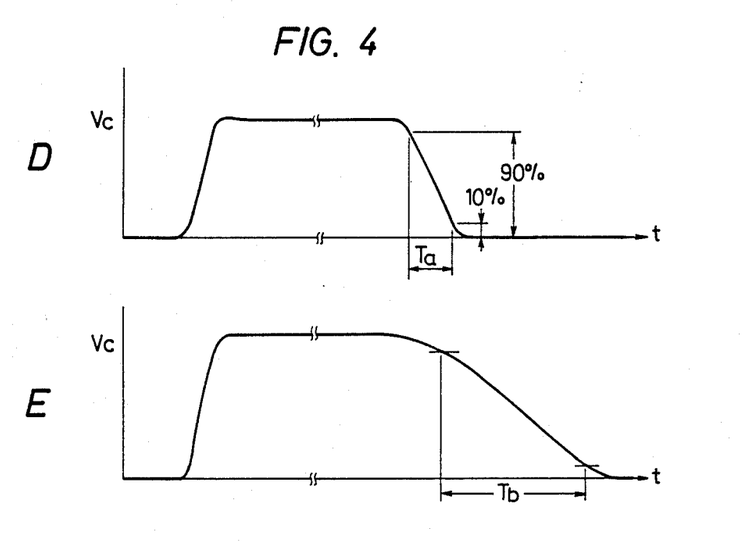
FIG. 4 shows the waveform of a switching pulse produced in the present invention as compared with the waveform of a pulse generated in the conventional circuit.

FIG. 4D shows the waveform of a switching pulse produced in the presence of the switching corrector circuit 430 and FIG. 4E shows the waveform of a switching pulse produced in the absence of the circuit 430. Each pulse is shown on an exaggerated time base. The fall time during which the first pulse is decreasing from 90% to 10% of its maximum level Vc is denoted by Ta, and that for the second pulse is denoted by Tb. As is obvious from the drawing, the switching corrector circuit 430 achieves a great reduction in the fall time (Ta<Tb), and this in turn decreases the power loss occurring during the fall time. The reduction in the power loss becomes more marked as the switching frequency is increased, and as a result, a further improvement in the transducing efficiency of the switching regulator is accomplished.

The switching corrector circuit 430 uses the switching pulses generated by the transistor 6, and so suffers no energy loss resulting from its operation. Furthermore, the circuit 430 is made up only of the capacitor 434 connected in series with the transformer 432 which also serves as a choke coil. In the embodiment shown, the transformer 432 is made of a choke transformer which is compact and inexpensive.

As another advantage of the illustrated embodiment, the drive current Id provided by the transistor 30 to the switching transistor 6 is added to the reproduced d.c. output, and this is another factor that increases the transducing efficiency of the switching regulator of the present invention. According to an experiment conducted by the present inventors, a transducing efficiency as high as about 93% could be attained thanks to the addition of the drive current to the d.c. output as well as the shortened switching time.

Figure 5:
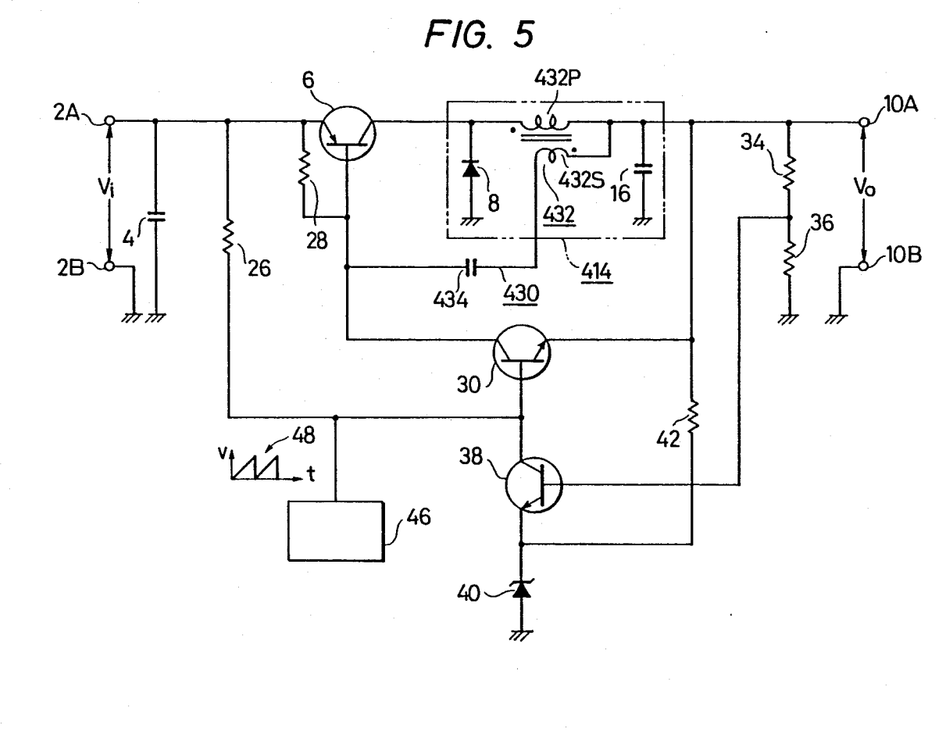
FIG. 5 is a circuit diagram showing another embodiment of the present invention.

The switching regulator described in the foregoing embodiment is of the self-excited type, but equally good results are obtained by configuring a separately excited regulator as shown in FIG. 5. The separately excited switching regulator of FIG. 5 has no capacitor 44 in the positive feedback circuit and the base of the drive transistor 30 is provided with a sawtooth or triangular reference wave 48 from a function generator 46, together with the variation in the voltage level that develops at the collector of the transistor 38. The desired control in pulse width can be accomplished with this circuit configuration. The separately excited switching regulator of the type shown in FIG. 5 achieves the same advantages as those of the self-excited type of FIG. 2. In either embodiment, an npn transistor is advantageously used as drive transistor 30 because no base current flows, but it should be understood that a pnp transistor can also improve the transducing efficiency by adding the drive current through the switching transistor 6 to the d.c. output. The transistor 38 may also be of the pnp type, rather than the npn type used in the illustrated embodiments.

In the embodiments of FIGS. 2 and 5, the switching pulses are detected by a choke transformer that also serves as a choke coil in the d.c. reproducing circuit 414, but it should be understood that the same object can be attained by an inductor other than a choke transformer. If desired, the inductor may be connected to some circuit element other than the circuit 414 that enables the detection of switching pulses.

The foregoing description concerns switching regulators, but it should be understood that the concept of the present invention is applicable to various switching circuits other than switching regulators of the type shown in the embodiments.

As will be apparent from the above, the present invention shortens the switching time of a switching transistor, and so not only improves the switching efficiency but also reduces the power loss resulting from the delayed switching operation.

Figure 6:
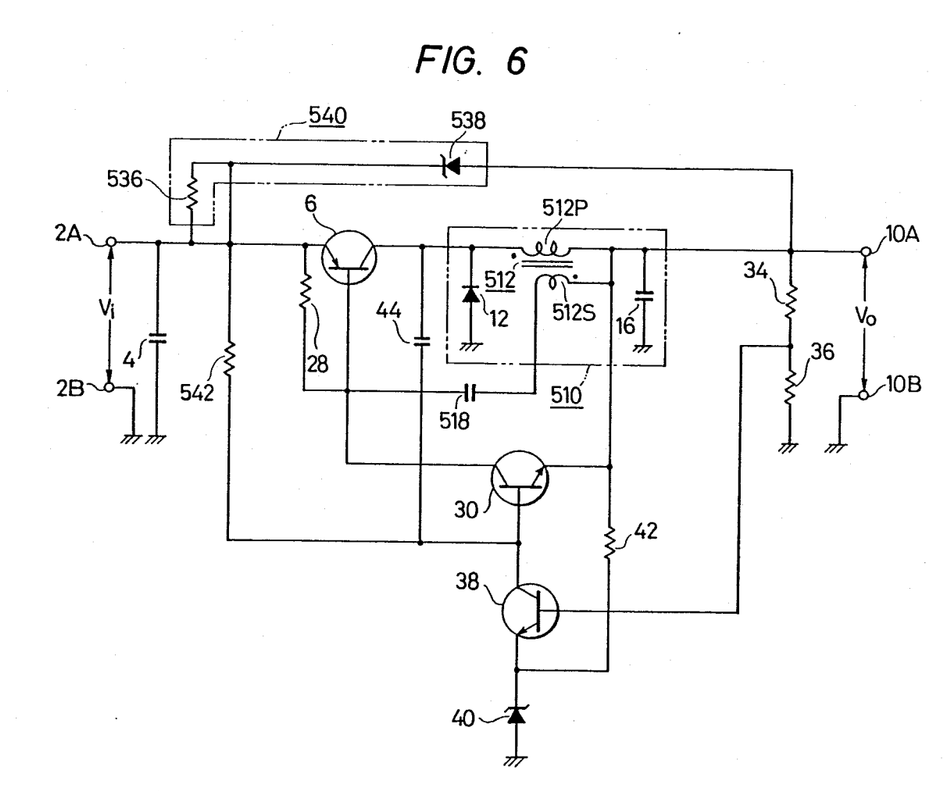
FIG. 6 is a circuit diagram showing another embodiment of the switching regulator of the present invention.

Another embodiment of the switching regulator of the present invention will be hereunder described by reference to FIG. 6. In the embodiment of FIG. 6, a capacitor 4 for absorbing the ripple component of a d.c. input is provided between input terminals 2A and 2B. The switching transistor 6 is connected between input terminal 2A and output terminal 10A on the higher potential side, with the emitter connected to 2A and the collector connected to 10A. The transistor 6 is connected to a d.c. reproducing circuit 510 that reproduces a d.c. voltage by rectifying the a.c. voltage produced by the transistor 6. Output terminal 10B and input terminal 2B are both connected to ground (GND).

The d.c. reproducing circuit 510 has a choke coil 512 connected in series with the switching transistor 6, a diode 12 connected between the collector of the transistor 6 and ground, with the collector connected to the cathode, and a smoothing capacitor 16 connected between the output terminal of the choke coil 512 and ground. The choke coil 512 has a primary winding 512 P and a secondary winding 512S which are wound so as to induce electromotive forces of opposite polarities. The two windings are connected to terminal 10A by a common terminal. The other terminal of the secondary winding 512S is connected to the base of the switching transistor 16 through a differentiating capacitor 518 so that switching pulses in a differential waveform are applied to the base of the transistor 6. A bias resistor 28 is connected between the base and emitter of the switching transistor 6.

For detecting a variation in the output voltage Vo, two resistors 34 and 36 are connected in series between the output terminals 10A and 10B, and the junction between these resistors is connected to the base of a control transistor 38 that provides an error amplifier for detecting a variation in the level of the output voltage Vo and which adaptively controls a drive transistor 30 provided for driving the switching transistor 6. A constant-voltage diode 40 is connected between the emitter of the control transistor 38 and ground, with the cathode connected to the emitter. The junction between the diode 40 and the emitter of transistor 38 is provided with an output from the d.c. reproducing circuit 510 through a resistor 42.

The drive transistor 30 is connected across the choke coil 512 between the base and collector of the switching transistor 6, with the collector of the transistor 30 connected to the base of the transistor 6. The drive transistor 30 is designed so that upon error detection by the control transistor 38, it supplies a drive current to the base of the transistor 6 to start a switching operation. Therefore, the drive transistor 30 provides an oscillating circuit together with the base and collector of the transistor 6 and a capacitor 44, and the width of pulses generated by oscillation is controlled by the operating current flowing through the control transistor 38. Therefore, the drive transistor 30 in combination with the control transistor 38 provides a pulse width modulating circuit.

A constant-voltage circuit 540 made of a resistor 536 connected in series with a constant-voltage diode 538 is connected across the switching transistor 6 and the choke coil 512 between the input terminal 2A and output terminal 10A on the higher potential side. The junction between the resistor 536 and diode 538 is connected through a resistor 542 to the collector of the control transistor 38 and the base of the drive transistor 30. Therefore, the constant-voltage circuit 540 in combination with the resistor 542 provides a constant-current supply circuit that feeds a constant current between the base and emitter of the control transistor 38, and between the base and emitter of the drive transistor 30.

The switching regulator having the circuit configuration described above is operated as follows. When switching pulses generated by the transistor 6 are returned by positive feedback to the base of the drive transistor 30 through the capacitor 44, the transistor 30 starts to oscillate. The base current for the oscillating transistor 30 is controlled by the operation of the control transistor 38. The operating current flowing through the transistor 38 reflects a variation in the output level as detected by comparing the voltage-divided d.c. bias on the base with the reference voltage provided for the emitter by the diode 40. Therefore, the control pulses applied to the base of the transistor 6 form a pulsive signal whose width is modulated according to the variation in the level of the d.c. output. As a result, the transistor 6 starts its switching operation.

The control operations described above are performed continuously; the d.c. input voltage Vi supplied across the terminals 2A and 2B is converted to switching (a.c.) pulses in the switching transistor 6, and the a.c. signal is rectified in the d.c. reproducing circuit 510 and drawn from the output terminals 10A and 10B as a stable d.c. output Vo.

In the switching operation described above, the d.c. input voltage Vi supplied across the terminals 2A and 2B is also fed to the constant-voltage circuit 540, and the voltage developed at the junction between the resistor 536 and diode 538 is constant and higher than the constant voltage at the output terminal 10A by an amount equal to the voltage drop occurring in the diode 538. Since the voltage at the emitter of each of the transistors 38 and 30 is held constant as is the output voltage, a constant operating current will flow to the respective transistors through the resistor 542 connected between the collector of the transistor 38 and the constant voltage site of the circuit 540 and between the base of the transistor 30 and the same constant-voltage site. The constant current flowing through the transistor 38 flows into the constant-voltage diode 40, which, as a result, develops a reference voltage adaptive to the input voltage Vi.

The sum of this reference voltage and the voltage across the base and emitter of the control transistor 38 is compared with the voltage-divided bias on the base of the transistor 38, and the result of this comparison determines the operating current that is to flow through the transistor 30 and controls the output voltage. In consequence, the input-output characteristics of the switching regulator are improved. In the embodiment of FIG. 6, the d.c. output on the higher potential side is used as the reference potential for the constant voltage circuit 540, so any loss or fluctuation is minimized.

As a further advantage of the embodiment of FIG. 6, the secondary winding 512S of the choke coil 512 induces pulses whose waveform is reversed in polarity from the waveform of pulses applied to the primary winding 512P. The induced pulses are differentiated in the capacitor 518 and applied to the base of the transistor 6. Therefore, the base of the transistor 6 is reverse-biased during the switching operation, and this is effective in shortening the switching time as described above.

The drive current returned from the switching transistor 6 flows out of the emitter of the transistor 30 and is supplied to the output of the d.c. reproducing circuit 510, and this reduces the power loss due to the drive current and improves the transducing efficiency of the switching regulator.

Figure 7:
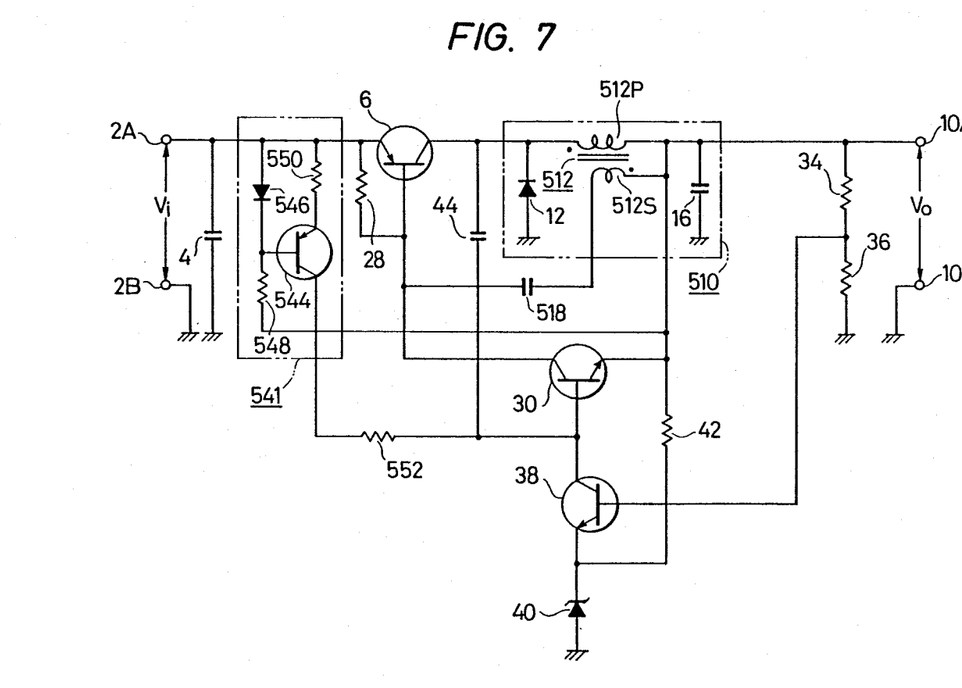
FIG. 7 is a circuit diagram showing still another embodiment of the present invention.

FIG. 7 shows another embodiment of the present invention, and the circuit components which are the same as those used in the embodiment of FIG. 6 are identified by like numerals. The switching regulator of FIG. 7 uses a constant-current circuit 541 in place of the constant-voltage circuit 540 used in the embodiment shown in FIG. 6. The constant-current circuit 541 is composed of a transistor 544, a diode 546 and resistors 548 and 550. The diode 546 and resistor 548 are connected in series across the d.c. reproducing circuit 510. The junction between the diode 546 and resistor 548 is connected to the base of the transistor 644. The emitter of the transistor 544 is connected to the input terminal 2A through a resistor 550, and the collector is connected to the collector the transistor 38 through a resistor 552. This arrangement, like that used in the embodiment of FIG. 6, is effective in providing a constant operating current through the control transistor 38 and the drive transistor 30.

Figure 8:
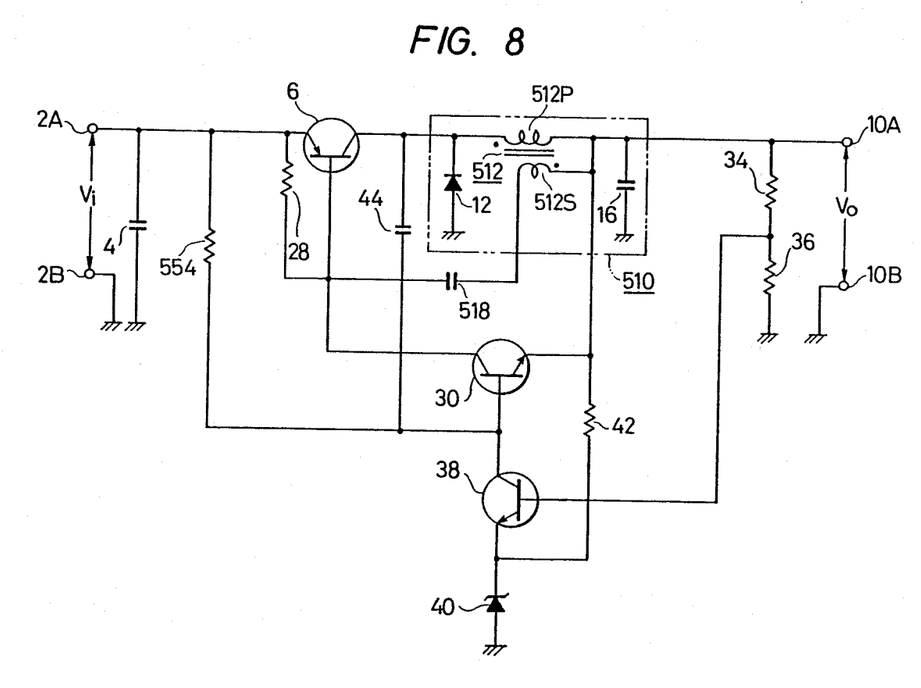
FIG. 8 is a circuit diagram showing a comparative switching regulator.
Figure 9:
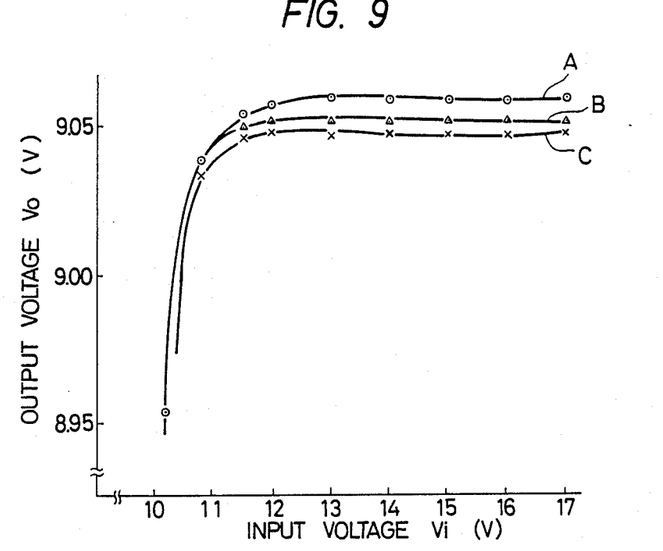
FIG. 9 is a graph showing the input-output characteristics of the switching regulator of the embodiment of FIG. 6.
Figure 10:
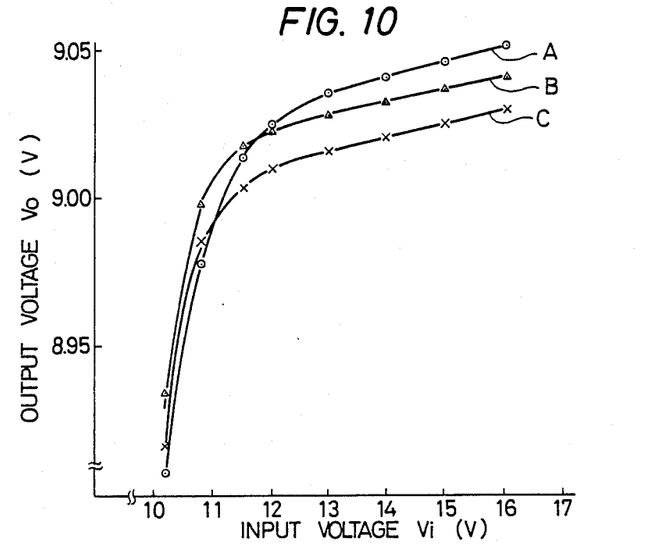
FIG. 10 is a graph showing the input-output characteristics of the switching regulator of FIG. 8.

The advantage of the above embodiments is hereunder described in greater detail by reference to FIGS. 8 to 10. FIG. 8 shows a comparative switching regulator which is the same as the embodiment of FIG. 6 except that the constant-voltage circuit 540 is replaced by a resistor 554, and the circuit components which are the same as those shown in FIG. 6 are identified by like numerals. FIG. 9 shows the input-output characteristics of the switching regulator of FIG. 6, and FIG. 10 depicts those of the circuit shown in FIG. 8. In each of FIGS. 9 and 10, three characteristic curves A, B and C are given and they respectively represent the characteristics as measured at $-20°$ C., $25°$ C. and $80°$ C. As one can readily see, the characteristics shown in FIG. 10 are not stable and the output voltage increases with increasing input voltage, but the characteristics depicted in FIG. 9 are very stable. This data shows how greatly the input-output characteristics of the switching regulator are improved by using the constant-current supply circuit described in these embodiments.

As will be apparent from the foregoing description, the switching regulator of these embodiments has improved input-output characteristics because it is designed to provide a constant operating current through the control transistor and drive transistor. Furthermore, this constant current is provided by using the potential on the d.c. output side as the reference voltage, so a constant-current output is effectively obtained on the d.c. output side without causing a substantial current loss.

Figure 11:
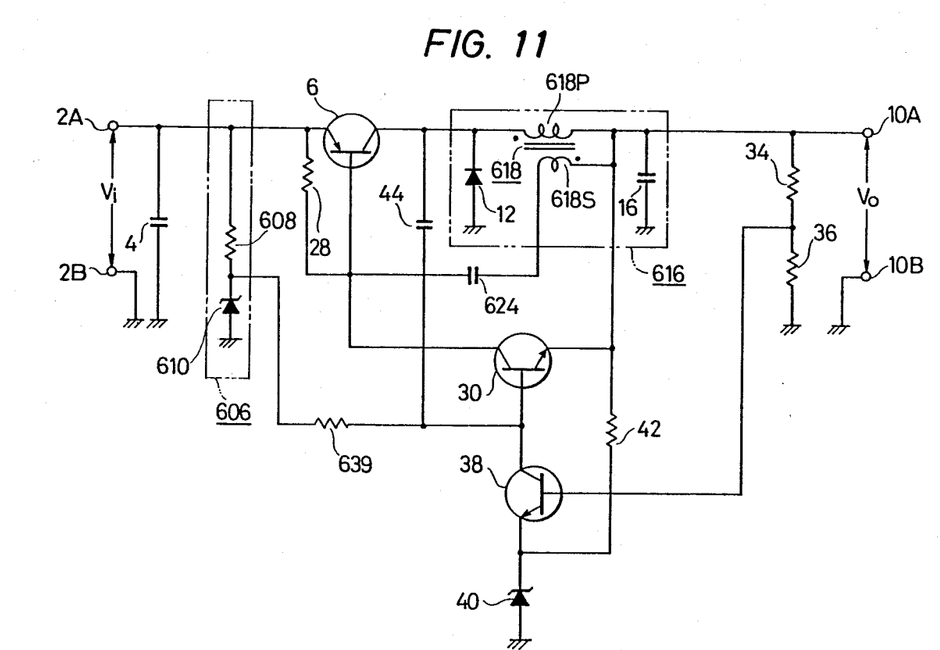
FIG. 11 is a circuit diagram showing still another embodiment of the switching regulator of the present invention.

Still another embodiment of the switching regulator of the present invention is hereunder described with reference to FIG. 11. In FIG. 11, the circuit components which are the same as those shown in the foregoing drawings are identified by like numerals. A constant-voltage circuit 606 for generating a constant-voltage upon application of an input voltage Vi is provided between input terminals 2A and 2B. The constant-voltage circuit 606 has a resistor 608 and a constant-voltage diode 610 connected in series between the input terminals 2A and 2B.

The switching transistor 6 is connected between the input terminal 2A and output terminal 10A, with the emitter connected to 2A and the collector connected to 10A. The transistor 6 is connected to a d.c. reproducing circuit 616 that reproduces a d.c. voltage by rectifying the a.c. voltage produced in the transistor 6. Output terminal 10B and input terminal 2B are both connected to ground.

The d.c. reproducing circuit 616 has a choke coil 618 connected in series to the switching transistor 6, a diode 12 connected between the collector of the transistor 6 and ground potential, with the cathode connected to the collector, and a smoothing capacitor 16 connected between the output terminal of the choke coil 618 and ground. The choke coil 618 has a primary winding 618P and a secondary winding 618S which are wound so that they induce electromotive forces of opposite polarities. The two windings are connected to output 10A by a common terminal. The other terminal of the secondary winding 618S is connected to the base of the switching transistor 6 through a differentiating capacitor 624 so that switching pulses in a differential waveform are applied to the base of the transistor 6. A bias resistor 28 is connected between the base and emitter of the switching transistor 6.

For detecting a variation in the output voltage Vo, two resistors 34 and 36 are connected in series between output terminals 10A and 10B, and the junction between these resistors is connected to the base of a control transistor 38 that provides an error amplifier for detecting a variation in the level of the output voltage Vo and which controls the switching operation on the basis of the detected error. A constant-voltage diode 40 is connected between the emitter of the control transistor 38 and ground potential, with the cathode connected to the emitter. The junction between the diode 40 and the emitter of transistor 38 is provided with the output from the d.c. reproducing circuit 616 through a resistor 42.

The collector of the control transistor 38 is connected to the base of a drive transistor 30 that actuates the switching operation of the transistor 6. The collector of transistor 38 is also connected to the junction between the resistor 608 and diode 610 in the constant-voltage circuit 606 through a resistor 639. Upon application of input voltage Vi, the constant-voltage circuit 606 supplies a constant current to the collector and emitter of the control transistor 38 and the base of the transistor 30.

The base of the drive transistor 30 is connected to the collector of the switching transistor 6 through a capacitor 44 so that switching pulses formed by the transistor 6 are positively fed back to the transistor 30. Therefore, the drive transistor 30 provides an oscillating circuit together with the base and collector of the transistor 6 and the capacitor 44, and the width of pulses generated by oscillation is controlled by the operating current flowing through the control transistor 38. Therefore, the transistor 30 in combination with the transistor 38 provides a pulse width modulating circuit.

The switching regulator having the circuit configuration described above is operated as follows. When switching pulses generated by the transistor 6 are returned by positive feedback to the base of the drive transistor 30 through the capacitor 44, the transistor 30 starts to oscillate. The base current for the oscillating transistor 30 is controlled by the operation of the transistor 38. The operating current flowing through the transistor 38 reflects a variation in the output level as detected by comparing the voltage-divided d.c. bias on the base with the reference voltage provided for the emitter by the diode 40. Therefore, the control pulses applied to the base of the transistor 6 form a pulsive signal whose pulse width is modulated according to the variation in the level of the d.c. output. As a result, the transistor 6 conducts a switching operation.

The control operation described above is performed continuously; the d.c. input voltage Vi applied across the terminals 2A and 2B is converted to switching (a.c.) pulses in the switching transistor 6, and the a.c. signal is rectified in the d.c. reproducing circuit 616 and drawn from the output terminals 10A and 10B as a stable d.c. output Vo.

In the switching operation described above, the d.c. input voltage Vi supplied across the terminals 2A and 2B is also fed to the constant-voltage circuit 606, and a constant current flows from the junction between the resistor 608 and diode 610 and goes down through the resistor 639 to the collector of the control transistor 38 and the base of the drive transistor 30. Since the voltage at the emitter of each of the transistors 38 and 30 is held constant by application of the output voltage, the value of this constant voltage and that of the constant voltage developed at the cathode of the diode 610 have such a relationship as to provide a constant current from the junction between resistor 608 and diode 610 through the resistor 639. As a result, a constant operating current flows through each of the transistors 30 and 38, and a reference voltage adaptive to the input voltage Vi develops at the diode 40.

The sum of this reference voltage and the voltage across the base and emitter of the transistor 48 is compared with the voltage-divided bias on the base of the transistor 38, and the result of this comparison determines the operating current that is to flow through the transistor 30 and controls the output voltage. In consequence, the input-output characteristics of the switching regulator are improved.

In the embodiment of FIG. 11, the secondary winding 618S of the choke coil 618 induces pulses whose waveform is reversed in polarity from the waveform of pulses applied to the primary winding 618P. The induced pulses are differentiated in the capacitor 624 and applied to the base of the transistor 6. Therefore, the base of the transistor 6 is reverse-biased during the switching operation, and this is effective in shortening the switching tim as described above.

The drive current returned from the switching transistor 6 flows out of the emitter of the transistor 30 and is supplied to the output of the d.c. reproducing circuit 616, and this reduces the power loss due to the drive current and improves the transducing efficiently of the switching regulator.

The input-output characteristics of FIG. 11 is very stable, similarily to that of FIG. 9.

As will be apparent from the foregoing description, the switching regulator of the this embodiment has improved input-output characteristics because it is designed to provide a constant operating current through the drive transistor and control transistor. As a further advantage, the improved input-output characteristics are stable against temperature variations.

What is claimed is:

1. A switching circuit, comprising, a switching transistor adapted to open or close responsive to an input pulse, a switching corrector circuit for receiving pulses from the switching transistor and reversing the polarity thereof, said switching corrector circuit differentiating said reversed pulses and providing the base of said switching transistor with said differentiated pulse superimposed on said input pulse, said switching corrector circuit comprising a choke transformer connected to said switching transistor, and a capacitor for providing the base of said switching transistor with differentiated pulses of reversed polarity from said choke transformer, whereby said input pulse has sharply inclined waveform to improve the efficiency of said switching circuit.

2. A switching circuit, comprising; a switching transistor for converting a d.c. input to an a.c. voltage, means for converting said a.c. voltage to a d.c. output voltage, a drive transistor for causing said switching transistor to perform a switching operation, a control transistor for detecting a variation in a level of the d.c. output voltage and for controlling a switching operation of said drive transistor according to the detected variation, constant current supply means for providing a constant operating current for said control transistor and said drive transistor, and a switching corrector circuit for feeding differentiated, reversed polarity switching transistor output pulses to a base of said switching transistor.

3. A switching circuit according to claim 2, wherein said constant current supply means comprises a constant-voltage circuit between an input terminal and an output terminal on the higher potential side of said switching circuit, said constant-voltage circuit supplying a constant current to said drive transistor and said control transistor.

4. A switching circuit according to claim 2, wherein said constant-current supply means includes a constant-voltage circuit between an input terminal and an output terminal on the higher potential side of said switching circuit and a constant-current circuit that produces a constant current in response to a bias input to said constant-voltage circuit.

5. A switching circuit according to claim 2, and further including a switching corrector circuit for feeding differentiated, reversed polarity switching transistor output pulses to the base of said switching transistor.

6. A switching circuit according to claim 5, wherein said switching corrector circuit comprises a choke transformer connected to said switching transistor, and a capacitor for providing the base of said switching transistor with differentiated pulses of reversed polarity from said choke transformer.

7. A switching circuit according to claim 2, wherein said constant-current supply means comprises a diode and a resistor connected across said converting means, and a transistor coupled at its base to the junction between said diode and resistor, at its emitter to the d.c. input through a resistor, and at its collector to said drive and control transistors.

8. A switching circuit according to claim 2, wherein said switching corrector circuit comprises a choke transformer connected to said switching transistor, and a capacitor for providing the base of said switching transistor with differentiated pulses of reversed polarity from said choke transformer.

9. A switching circuit, comprising; input terminals for receiving a d.c. input; a switching transistor for converting said d.c. input to an a.c. voltage, means for converting said a.c. voltage to a d.c. output voltage, a drive transistor for causing the switching transistor to perform a switching operation, a control transistor for detecting a variation in a level of the d.c. output voltage by comparison with a reference voltage and for controlling a switching operation of said drive transistor according to the detected variation, a constant-voltage circuit connected between the input terminals receiving said d.c. input and which provides a constant operating current for said drive and control transistors and, a switching corrector circuit for feeding differentiated, reversed polarity switching transistor output pulses to a base of said switching transistor.

10. A switching circuit according to claim 9, wherein said constant-voltage circuit comprises a resistor connected in series with a constant-voltage diode for supplying a constant current to said drive and control transistors from the junction therebetween upon application of an input voltage to said constant-voltage circuit.

11. A switching circuit according to claim 9, wherein said switching corrector circuit comprises a choke transformer connected to said switching transistor, and a capacitor for providing the base of said switching transistor with differentiated pulses of reversed polarity from said choke transformer.

* * * * *